US008062986B2

(12) United States Patent
Khrapko et al.

(10) Patent No.: US 8,062,986 B2
(45) Date of Patent: Nov. 22, 2011

(54) FUSED SILICA HAVING LOW OH, OD LEVELS AND METHOD OF MAKING

(75) Inventors: Rostislav Radievich Khrapko, Corning, NY (US); Nicolas LeBlond, Painted Post, NY (US); James Edward Tingley, Swain, NY (US)

(73) Assignee: Corning Incorporated, Corning, NY (US)

( * ) Notice: Subject to any disclaimer, the term of this patent is extended or adjusted under 35 U.S.C. 154(b) by 128 days.

(21) Appl. No.: 11/881,599

(22) Filed: Jul. 27, 2007

(65) Prior Publication Data

US 2009/0029842 A1 Jan. 29, 2009

(51) Int. Cl.
*C03C 3/06* (2006.01)
*C03B 19/06* (2006.01)
*C03B 19/00* (2006.01)

(52) U.S. Cl. .............................. 501/54; 65/17.4; 65/17.6

(58) Field of Classification Search ............... 501/53, 501/54; 65/17.4, 17.6
See application file for complete search history.

(56) References Cited

U.S. PATENT DOCUMENTS

| 6,813,908 | B2 | 11/2004 | Early et al. ................ 65/399 |
| 2002/0194877 | A1 | 12/2002 | Chang et al. |
| 2002/0197035 | A1 | 12/2002 | Early et al. .............. 385/123 |
| 2004/0057692 | A1 | 3/2004 | Ball et al. ................ 385/142 |
| 2005/0172676 | A1* | 8/2005 | Roselieb et al. ........... 65/421 |
| 2005/0201699 | A1 | 9/2005 | Ball et al. ................ 385/123 |
| 2005/0223747 | A1 | 10/2005 | Ball et al. ................ 65/397 |
| 2006/0137399 | A1 | 6/2006 | Alan et al. |
| 2006/0234848 | A1 | 10/2006 | Kuehn et al. |
| 2007/0105703 | A1* | 5/2007 | Bookbinder et al. ........ 501/54 |
| 2008/0287279 | A1* | 11/2008 | Bookbinder et al. ........ 501/53 |
| 2009/0203512 | A1* | 8/2009 | Fiacco et al. ............ 501/54 |

FOREIGN PATENT DOCUMENTS

| WO | WO02/051762 | 7/2002 |
| WO | WO2004/020357 | 3/2004 |
| WO | 2005054144 A1 | 6/2005 |

OTHER PUBLICATIONS

Patent Abstract of Japan for Publication No. 08183621; Publication Date Jul. 16, 1996 With the Patent Attached.
Patent Abstracts of Japan for Publication No. 08133753; Publication Date May 28, 1996 With the Patent Attached.

* cited by examiner

*Primary Examiner* — Jerry A Lorengo
*Assistant Examiner* — Noah Wiese
(74) *Attorney, Agent, or Firm* — Robert P. Santandrea

(57) ABSTRACT

A fused silica article having a combined concentration of hydroxyl (OH) and deuteroxyl (OD) concentration of less than 10 parts per million (ppm) and, in one embodiment, less than 1 ppm. The fused silica article is formed by drying a soot blank in a halogen-free atmosphere comprising carbon monoxide. The dried soot blank may optionally be doped to reach target levels of OH and OD concentrations and improve homogeneity within the fused silica article. The dried soot blank is then oxidized and, sintered to form the article. A method of reducing the combined concentration of OH and OD to less than 10 ppm is also described.

39 Claims, 5 Drawing Sheets

FUSED SILICA HAVING LOW OH, OD LEVELS AND METHOD OF MAKING

BACKGROUND

The invention relates to fused silica and articles made therefrom. More particularly, the invention relates to fused silica having low concentrations of hydroxyl (OH) groups and deuteroxyl (OD) groups. Even more particularly, the invention relates to a method of making fused silica glass having low concentrations of the above-mentioned species in a halogen-free environment.

Fused silica optical components used in the semiconductor field, particularly in the area of photolithography, have stringent requirements for both dynamic and static properties. Such components are typically exposed to ultraviolet light having a wavelength of about 360 nm or less such as, for example, an excimer laser beam or some other ultraviolet laser beam. As the photon energy, pulse energy, and pulse rate increase, the intrinsic and extrinsic properties of the optical components such as density, refractive index, induced absorption, fluence dependent transmission (FDT), and laser induced wave front distortion (LIWFD), and polarization induced birefringence (PIB) are affected.

It has been generally known that high purity fused silica prepared by such methods as flame hydrolysis, CVD-soot remelting processes, plasma CVD processes, electrical fusing of quartz crystal powder, and other methods is susceptible to laser damage. The presence of hydroxyl (referring here to hydrogen having a naturally occurring isotopic distribution) groups in the silica increases resistance to optical deterioration. In addition, hydroxyl content may be controlled by 'drying 'the fused silica soot blank with halogens, such as fluorides or chlorides. One approach to making fused silica for optical components is to form a silica soot containing no chlorine. The soot is doped with water and heated for a very long time to achieve a homogenous OH distribution throughout the fused silica article. In a second approach, the soot is processed such that the fused silica simultaneously contains low levels of water and chlorine. While low levels of these dopants help promote homogeneity, the distribution of chlorine and OH within the fused silica is difficult to control.

SUMMARY

The present invention provides a fused silica article having a combined concentration of hydroxyl (OH) and deuteroxyl (OD) groups of less than 10 parts per million (ppm) and, in one embodiment, less than 1 ppm. The fused silica article is formed by drying a soot blank in a halogen-free atmosphere comprising carbon monoxide (CO). The dried soot blank may optionally be doped to reach target levels of OH and OD concentrations and to improve homogeneity. The dried soot blank is then oxidized and sintered to form the article. A method of reducing the combined concentration of OH and OD to less than 10 ppm in a fused silica article is also described.

The present invention provides a fused silica article having a combined concentration of hydroxyl (OH) and deuteroxyl (OD) groups of less than 10 parts per million (ppm) and, in one embodiment, less than 1 ppm. The fused silica article is formed by drying a soot blank in a halogen-free atmosphere comprising carbon monoxide (CO). The dried soot blank may optionally be doped to reach target levels of OH and OD concentrations and to improve homogeneity. The dried soot blank is then oxidized and sintered to form the article. A method of reducing the combined concentration of OH and OD to less than 10 ppm in a fused silica article is also described. Accordingly, one aspect of the invention is to provide a fused silica article having a mean combined concentration of OH and OD of less than about 10 ppm. The fused silica article is formed by: providing a soot blank; drying the soot blank in a halogen-free atmosphere comprising carbon monoxide; oxidizing the dried soot blank; and sintering the blank to form the fused silica article.

A second aspect of the invention is to provide a method of decreasing a combined OH and OD concentration in a fused silica article to a mean concentration of less than about 10 ppm. The method comprises the steps of: providing a soot blank; and drying the soot blank to decrease the mean combined OH and OD concentration to less than about 10 ppm, wherein drying the soot blank comprises heating the soot blank at a temperature in a range from about 1150° C. up to about 1300° C. in a halogen-free atmosphere comprising carbon monoxide and at least one of a deuterium-containing species and a protium-containing species.

A third aspect of the invention is to provide a fused silica article having a mean combined OH and OD concentration of less than about 10 ppm. The fused silica article is formed by: providing a soot blank; drying the soot blank, wherein drying the soot blank comprises heating the soot blank at a temperature in a range from about 1150° C. up to about 1300° C. in a halogen-free atmosphere comprising carbon monoxide and at least one of a deuterium-containing species and a protium-containing species; oxidizing the dried soot blank at a predetermined temperature in an oxidizing atmosphere comprising an inert gas and oxygen; and sintering the oxidized soot blank to form the fused silica article having a mean combined OH and OD concentration of less than about 10 ppm.

A fourth aspect of the invention is to provide a method of making a fused silica article. The method comprises the steps of: providing a soot blank; drying the soot blank in a halogen-free atmosphere comprising carbon monoxide; oxidizing the dried soot blank; and sintering the blank to form the fused silica article.

These and other aspects, advantages, and salient features of the present invention will become apparent from the following detailed description, the accompanying drawings, and the appended claims.

DETAILED DESCRIPTION

Figure 1:
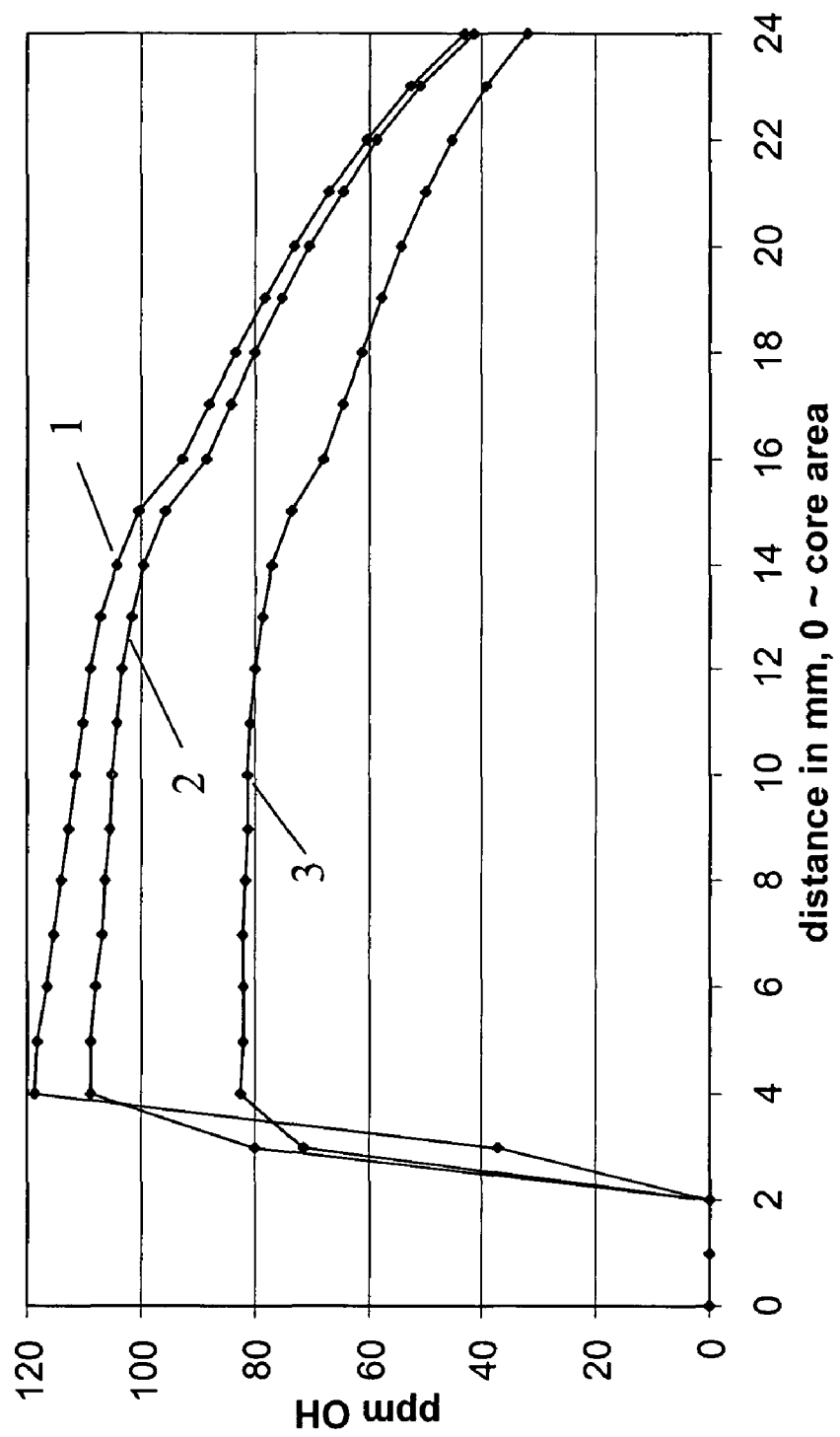
FIG. 1 is a plot of OH concentration as a function of position for a sintered soot blank that was dried in an atmosphere comprising 1% CO in He for three hours as temperature was ramped from 1100° C. up to 1200° C.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general and to FIG. 1 in particular, it will be understood that the illustrations are for the purpose of illustration and describing particular embodiments of the invention and are not intended to limit the invention thereto.

As used herein, the term "hydroxyl(s)" or OH means a moiety or a group of moieties each consisting of an oxygen atom and a protium atom ($_1^1H$, referred to herein as "H"), unless otherwise specified. The oxygen atom may be any of the naturally occurring isotopes of oxygen ($^{16}O$, $^{17}O$, or $^{18}O$), or mixtures thereof at any proportion. As used herein, n(OH) means the total number of OH moieties in a material.

As used herein, the term "deuteroxyl(s)" or OD means a moiety or a group of moieties, each consisting of an oxygen atom and a deuterium atom ($_1^2H$ or $_1^2D$, referred to herein as "D"). The oxygen atom may be any of the naturally occurring isotopes of oxygen ($^{16}O$, $^{17}O$ or $^{18}O$), or mixtures thereof at any proportion. As used herein, n(OD) means the total number of OD moieties in a material.

A fused silica article such as, but not limited to, lenses that are capable of operating in the ultraviolet region of the spectrum, is provided. The fused silica article has a mean combined concentration of hydroxyl (also referred to herein as "OH") and deuteroxyl (also referred to herein as "OD") groups of less that about 10 parts per million (ppm) by weight. In one embodiment, the combined concentration of OH and OD is less than about 1 ppm. As used herein, the terms "total concentration" and "combined concentration" refer to the sum of the concentrations of OD (n(OD)) and OH (n(OH))—i.e., combined concentration=n(OD)+n(OH). In some embodiments the deuteroxyl species is present in an amount that is greater than the natural isotopic abundance of deuterium; i.e., the ratio of n(OD)/(n(OD)+n(OH)) in the material is greater than $2 \times 10^{-4}$. In other embodiments, the deuteroxyl species is present in an amount that is corresponds to the natural isotopic abundance of deuterium; i.e., n(OD)/(n(OD)+n(OH))=$2 \times 10^{-4}$.

The fused silica article is formed by first providing a soot blank. The soot blank is then dried in a halogen-free atmosphere that comprises carbon monoxide (CO), and the dried soot blank is then oxidized. The oxidized soot blank is then sintered to form the fused silica article. In one embodiment, the sintered blank forms a near net shape of a fused silica article such as, for example, a lens. The near net shape may be subsequently cut, ground, or otherwise worked to its final shape using those techniques known in the art.

Methods of forming soot blanks for fused silica articles are well known in the art. The soot blank—or preform—may be provided, for example, by a deposition method in which a gas stream containing a silicon-containing compound in vapor form is produced. The gas stream containing the silicon-containing compound is passed into the flame of a combustion burner to form amorphous particles of fused silica soot. The fused silica particles are deposited onto a support to form the fused silica soot blank. The support may be a supporting core cane or a mandrel, such as those in a typical outside vapor deposition (OVD), planar soot deposition (PSD), or a vapor axial deposition (VAD) process. If a mandrel is used, the mandrel may be removed after deposition to yield a hollow, cylindrically-shaped, porous soot body.

The soot particles are typically provided by flame hydrolysis of at least one silicon precursor compound. Silicon precursor compounds include, but are not limited to, halogen-containing compounds such as $SiCl_4$, $SiBr_4$, $SiF_4$, and the like. Silicon precursor compounds also include, but are not limited to, halide-free cyclosiloxane compounds such as, for example, polymethylsiloxanes. Such polymethylsiloxanes include hexamethyldisiloxane, polymethylcyclosiloxane, octamethylcyclotetrasiloxane (OMCTS), decamethylcyclopentasiloxane, hexamethylcyclotrisiloxane, and combinations thereof.

The soot blank is typically formed or "laid down" on a cane or bait rod, such as those known in the art. The soot blank, in one embodiment, is substantially germanium-free. As used herein, "germanium-free" means that germanium is not intentionally added or introduced into the soot blank in either elemental form or as a germanium-containing compound. It is understood that the soot blank may inadvertently contain small amounts of germanium due to contamination.

The soot blank may range in size from about 1 kg up to about 500 kg. In one embodiment, the mass of the soot blank is in a range from about 1 kg up to about 50 kg. In one particular embodiment, the soot blank has a mass of about 4 kg. The density of the soot blank is in a range from about 0.2 $g/cm^3$ up to about 1.5 $g/cm^3$. In one embodiment, the density of the soot blank is in a range from about 0.3 $g/cm^3$ up to about 0.7 $g/cm^3$. In one particular embodiment, the density is about 0.45 $g/cm^3$.

Prior to drying, the soot blank may be placed in a furnace and preheated to ensure that the entire blank is at thermal equilibrium. Preheating is carried out at a predetermined temperature for a predetermined time. In one embodiment, the predetermined preheating temperature is in a range from about 1000° C. up to about 1250° C. The preheating step may be carried out for a time of up to about 20 hours. In one particular embodiment, the soot blank is preheated at a temperature of about 1225° C. for about two hours.

After preheating, deuteroxyl groups may be exchanged for hydroxyl groups within the soot blank. In one embodiment, the reaction is carried out by heating the soot blank a temperature of about 1200° C. for about four hours in a continuous flow of helium that has been saturated with $D_2O$ vapor at room temperature. The deuterium in the $D_2O$ vapor replaces OH with OD in the soot blank.

Once formed, the soot blank is dried—i.e., residual hydroxyl and/or deuteroxyl moieties are removed—in a substantially halogen-free atmosphere that comprises carbon monoxide (CO). Unless otherwise specified, the drying step is carried out in an atmosphere in which the gas is continuously flowed or "swept" over the soot blank. As used herein, "substantially halogen-free" means that halogens (fluorine, chlorine, bromine, and iodine) are not intentionally added to the fused silica in either elemental form or as a halogen-containing compound. It is understood that the fused silica may inadvertently contain small amounts of halogen due to contamination. The mechanism for drying may be based on the reaction between CO and OH (or OD) to yield protium (or deuterium) and carbon dioxide.

In the drying step, the halogen-free atmosphere comprises from about 0.01% up to 100% carbon monoxide. In those embodiments where the halogen-free atmosphere does not consist solely of CO, the halogen-free atmosphere further comprises at least one inert or relatively unreactive gas such as, but not limited to, helium, argon, nitrogen, neon, and the like. In one embodiment, the halogen-free atmosphere comprises from about 0.5% up to about 10% carbon monoxide. In one particular embodiment, the halogen-free atmosphere comprises about 1% CO.

In the drying step, the soot blank is heated in the halogen-free atmosphere containing carbon monoxide at a temperature in a range from about 1150° C. up to about 1300° C., although drying may be carried out at significantly lower temperatures. However, drying the soot blank at temperatures below the range given above is very slow. In one embodiment, drying the soot blank comprises heating the soot blank at a temperature in a range from about 1200° C. up to about 1260° C. In one particular embodiment, the soot blank is dried at about 1220° C. The drying step may be carried out for a time period ranging from about two hours up to about 200 hours. In one embodiment, the drying step is carried out for a time ranging from about 20 hours up to about 40 hours.

In one embodiment, the soot blank is doped with protium, deuterium, or both in order to achieve a predetermined or desired concentration of at least one of OH and OD and to improve the homogeneity of the OD and/or OD concentration in the fused silica article. The doping step may be carried out in conjunction with the drying step. In one embodiment, the soot blank is exposed to a continuously flowing halogen-free gas mixture comprising an inert gas, carbon monoxide, and at least one of protium and deuterium in molecular form (i.e., $H_2$, $D_2$, or DH). The CO concentration may be in a range from about 0.5% up to about 10%, while the combined or total concentration of protium and deuterium is in a range from about 0.001 up to about 0.1%. In one particular embodiment, the CO concentration is about 1% and the $D_2$ concentration is about 0.015%. The combined drying and doping steps are carried out in a halogen-free atmosphere at a temperature in a range from about 1150° C. up to about 1300° C. In one embodiment, the combined drying/doping step comprises heating the soot blank at a temperature in a range from about 1200° C. up to about 1260° C. In one particular embodiment, the soot blank is simultaneously dried and doped at 1220° C. The combined drying/doping step may be carried out for a time period ranging from about two hours up to about 200 hours. In one embodiment, the drying step is carried out for a time ranging from about 20 hours up to about 40 hours.

In one embodiment, the dried soot blank is heated at a temperature in a range from about 1000° C. up to about 1225° C. while being "swept" with a helium atmosphere (i.e., exposed to continuously flowing helium) for up to four hours. In one particular embodiment, the dried soot blank is swept with helium for two hours while being heated at 1225° C.

In the oxidizing step, the dried soot blank is heated at a temperature in a range from about 1000° C. up to about 1260° C. in an atmosphere comprising oxygen and an inert gas such as, but not limited to, helium. The oxygen should essentially be free of water. In the oxidizing step, the oxygen concentration is in a range from about 0.5% up to about 5%. In one particular embodiment, the dried soot blank is heated at 1225° C. in an atmosphere comprising 2% oxygen in helium for one hour.

Once oxidized, the soot blank is sintered at a temperature of up to about 1500° C. in an inert gas atmosphere containing from 0.5% up to 2% oxygen to form the fused silica article. The actual sintering temperature used in the sintering step depends on the configuration of the sintering furnace. The fused silica article may be subjected to subsequent finishing steps such as shaping, grinding, polishing, and the like to form finished products such as, for example, a lens used in a photolithography system. The oxygen used in the sintering step should be essentially water-free. If trace amounts of water are present in the oxygen-containing atmosphere, the soot blank will absorb water during the sintering step, resulting in an increase in the OH concentration at or near the edges of the sintered article. In one particular embodiment, the oxidized blank is heated at about 1500° C. in a continuously flowing helium atmosphere containing 2% oxygen.

The distribution of OH, OD, or both throughout the fused silica article, particularly if the soot blank has been doped with at least one of OH and OD as described above, is homogenous. The combined concentration of OH and OD at any given point in the fused silica article varies by less than 4 ppm from the mean combined concentration of OH and OD. In one embodiment, the combined OH and OD concentration at any given point in the fused silica article varies by less than 2 ppm from the mean combined OH and OD concentration. In those embodiments where the mean combined concentration of OH and OD is less than 1 ppm, the combined concentration of OH and OD at any given point in the fused silica article varies by less than 0.4 ppm from the mean combined OH and OD concentration and, in another embodiment, the combined concentration of OH and OD at any given point in the fused silica article varies by less than 0.2 ppm from the mean combined OH and OD concentration.

A method of decreasing at least one of OH concentration and OD concentration in a fused silica article to less than 10 ppm is also provided. The method includes the providing a soot blank as described previously herein. In one embodiment, the soot blank is substantially free of germanium. The soot blank is dried, as previously described herein, by heating the soot blank at a temperature in a range from about 1150° C. up to about 1300° C. in an atmosphere comprising carbon monoxide and at least one of protium and deuterium in molecular form to decrease the combined OH and OD concentration to less than about 10 ppm and, in one embodiment, to less than 1 ppm.

A method of making a fused silica article having a combined OH and OD concentration of less than about 10 ppm and, in one embodiment, less than 1 ppm, is also provided. A soot blank is first provided. The soot blank is dried in a halogen-free atmosphere comprising carbon monoxide and then oxidized and sintered, as previously described herein.

The following examples illustrate the various features and advantages of the invention and in are in no way intended to limit the invention thereto.

EXAMPLE 1

Drying During Ramp from 1100° C. to 1200° C.

A cylindrical soot blank was dried in a furnace for three hours using an atmosphere comprising 1% CO in He. The furnace temperature was ramped from 1100° C. up to 1200° C. over a two hour period. Following the drying process, the blank was oxidized and sintered with a downdrive speed—i.e., the speed at which the blank is moved downward through a vertical furnace—of 5 mm/min. The tapered ends of the sintered soot blank were removed and OH concentrations were measured for cross-sections of the remaining uniformly cylindrical soot blank. The OH concentration was measured for cross-sectional samples taken at the mid-point of the soot blank, the top of the soot blank, and the bottom of the soot blank. As used herein, "top" and "bottom" refer to the vertical orientation of the soot blank with respect to the vertical furnace. Each of the top and bottom cross-sections was obtained at a point that was located at a distance, which was 5% of the total length of the cylindrical portion of the soot blank, from the respective ends of the cylindrical portion. For example, for a cylindrical soot blank having a length of 100 cm, the top cross-sectional sample would be taken at a point 5 cm from the top end of the cylindrical portion of the soot blank, the mid-point cross-sectional sample would be taken at the mid-point of the cylindrical portion, and the bottom cross-sectional sample would be taken at a point 5 cm from the bottom end of the soot blank. FIG. 1 is a plot of OH concentrations in the sintered blank as measured from the center or core of the cylindrical piece for a top section ((1) in FIG. 1), mid-point (2), and bottom section (3). The resulting OH concentration ranged from 80 ppm to 120 ppm axially and from 80 ppm to 35 ppm radially. The results suggest that the reaction between CO and OH yielding hydrogen and carbon dioxide—and thus the CO drying process—is inefficient at temperatures below 1200° C.

EXAMPLE 2

Drying at 1200° C.

Figure 2:
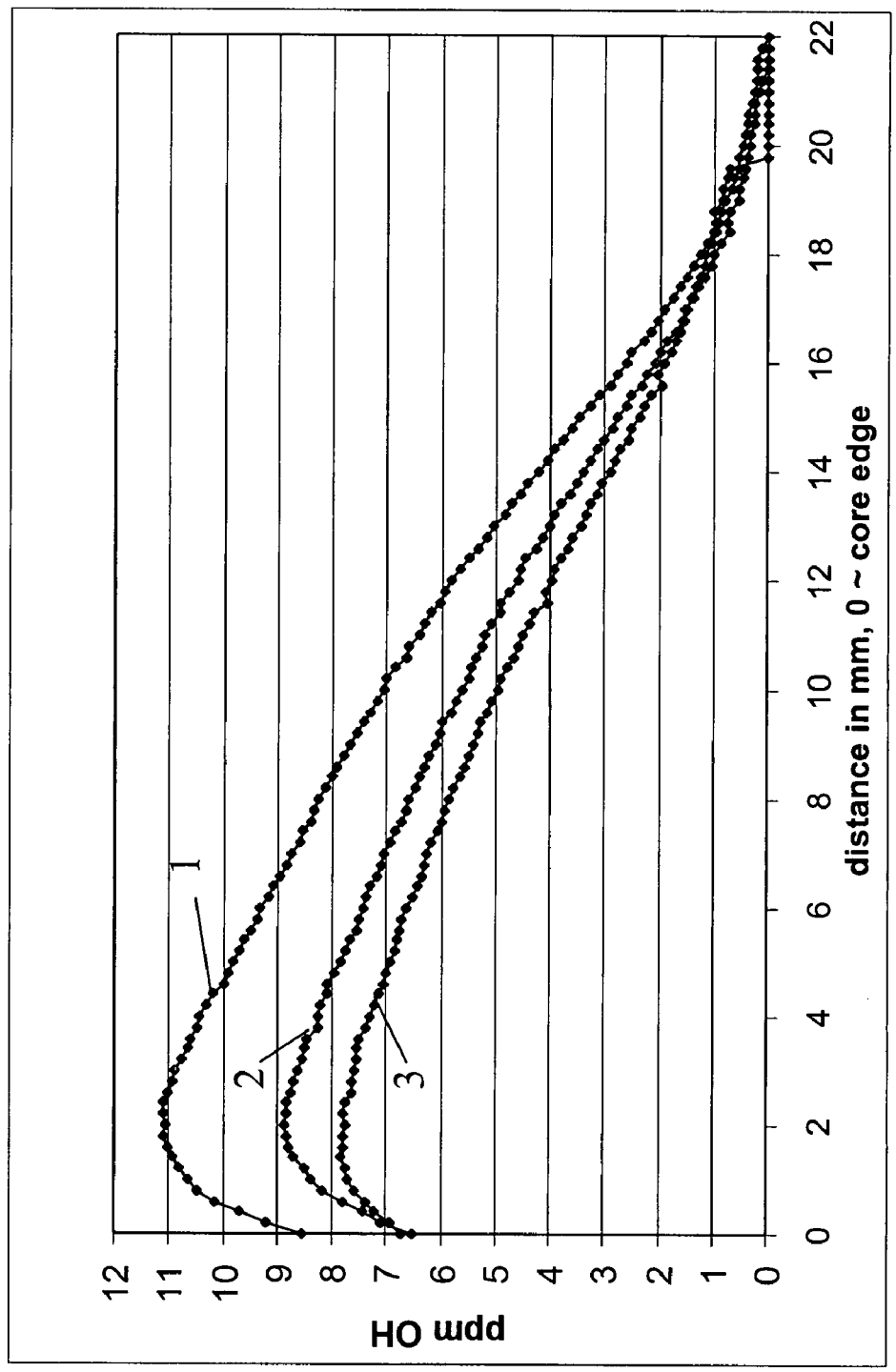
FIG. 2 is a plot of OH concentration as a function of position for a sintered soot blank that was dried at 1200° C. for two hours in an atmosphere comprising 1% CO in He.

A cylindrical soot blank was dried in a furnace for two hours at 1200° C. in an atmosphere comprising 1% CO in He, followed by sintering in the same atmosphere with a down-drive speed of 5 mm/min through a vertical furnace having a zone maintained at about 1500° C. The tapered ends of the soot blank were removed and OH concentrations were measured for cross sections of the remaining uniform, cylindrical soot blank, as described in Example 1. FIG. 2 is a plot of OH concentrations in the sintered blank as measured from the center or core of the cylindrical piece for a top section ((1) in FIG. 2), mid-point (2), and bottom section (3). In the axial direction, the OH concentration varied from 8 ppm to 11 ppm, whereas the OH concentration in the radial direction ranged from 11 ppm to near-zero values. Thus, the effectiveness of CO drying at temperatures above 1200° C. resulted in a decrease in OH concentration of one to two orders of magnitude over the OH concentration observed in Example 1.

EXAMPLE 3

Figure 3:
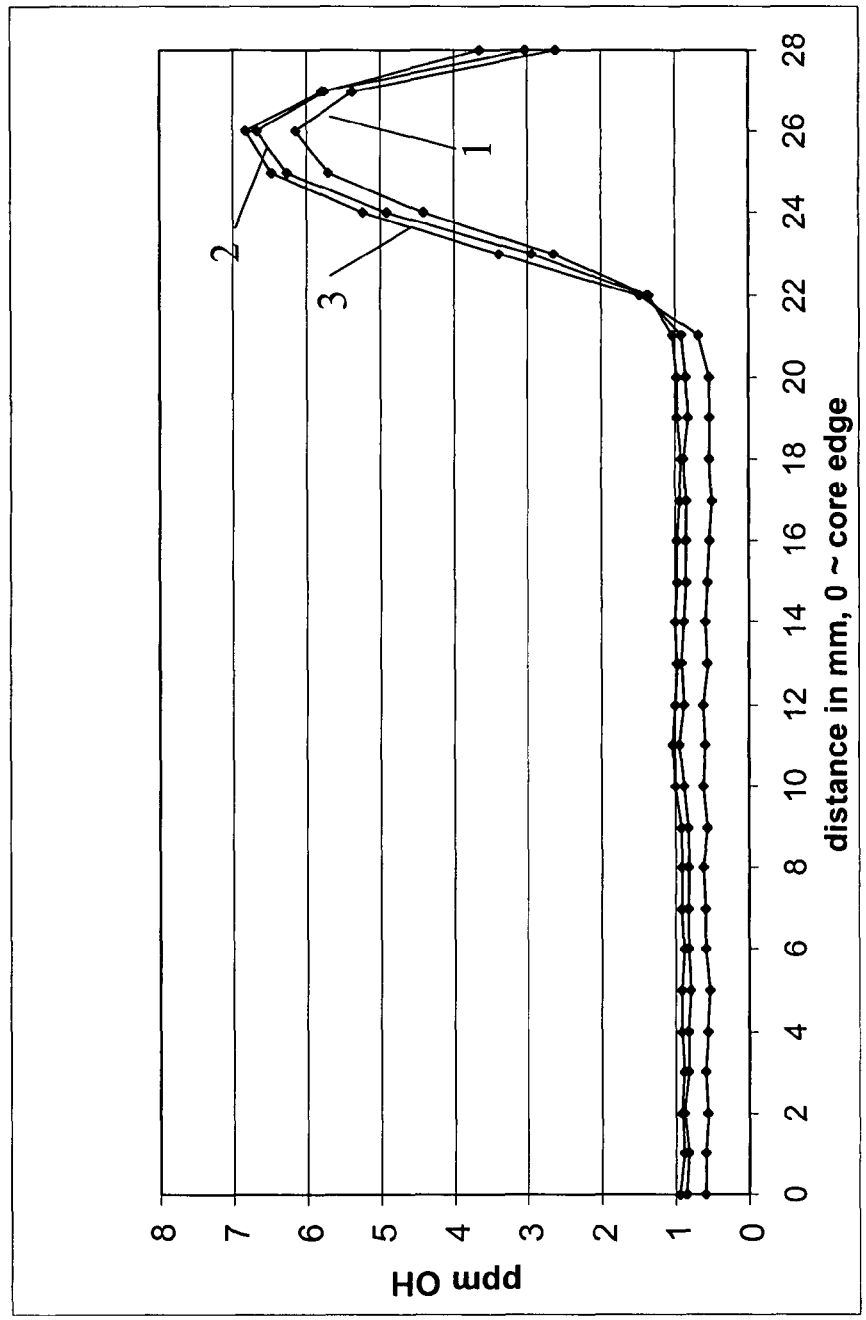
FIG. 3 is a plot of OH concentration as a function of position for a sintered soot blank that was dried at 1225° C. for 16 hours in an atmosphere comprising 1% CO in He.

A cylindrical soot blank was dried in a helium atmosphere containing 1% CO at 1225° C. for 16 hours, oxidized in a helium atmosphere containing 2% oxygen for one hour, and sintered at 1225° C. at in a helium atmosphere containing 2% oxygen for 3-6 hours. The tapered ends of the soot blank were removed and OH concentrations were measured for cross sections of the remaining uniform, cylindrical soot blank, as described in Example 1. The OH concentration of the resulting cylindrical fused silica piece is plotted in FIG. 3 as a function of distance from the center or core of the cylindrical piece for a top section ((1) in FIG. 3), mid-point (2), and bottom section (3). The OH concentration was less than about 1 ppm in the region extending out to about 20 cm from the center of the core, whereas the OH concentration near ($\geq$~22 cm from the core) the outer surface of the fused silica piece ranged from 6 ppm to 7 ppm due to doping of the outer surface by trace amounts of water present during sintering.

EXAMPLE 4

Figure 4:
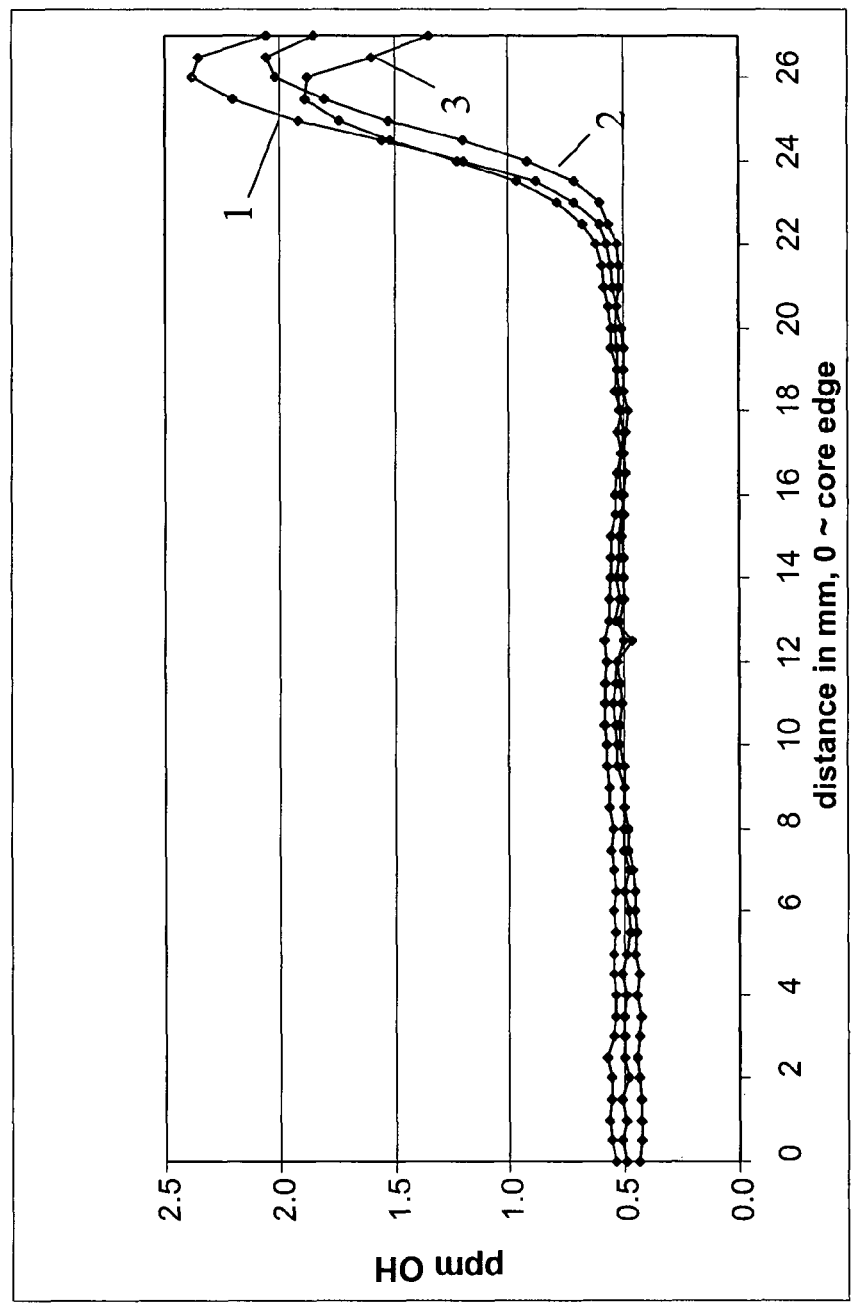
FIG. 4 is a plot of OH concentration as a function of position for a sintered soot blank that was dried at 1225° C. for 16 hours in an atmosphere comprising 1% CO in He in which deuterium was added for one hour.
Figure 5:
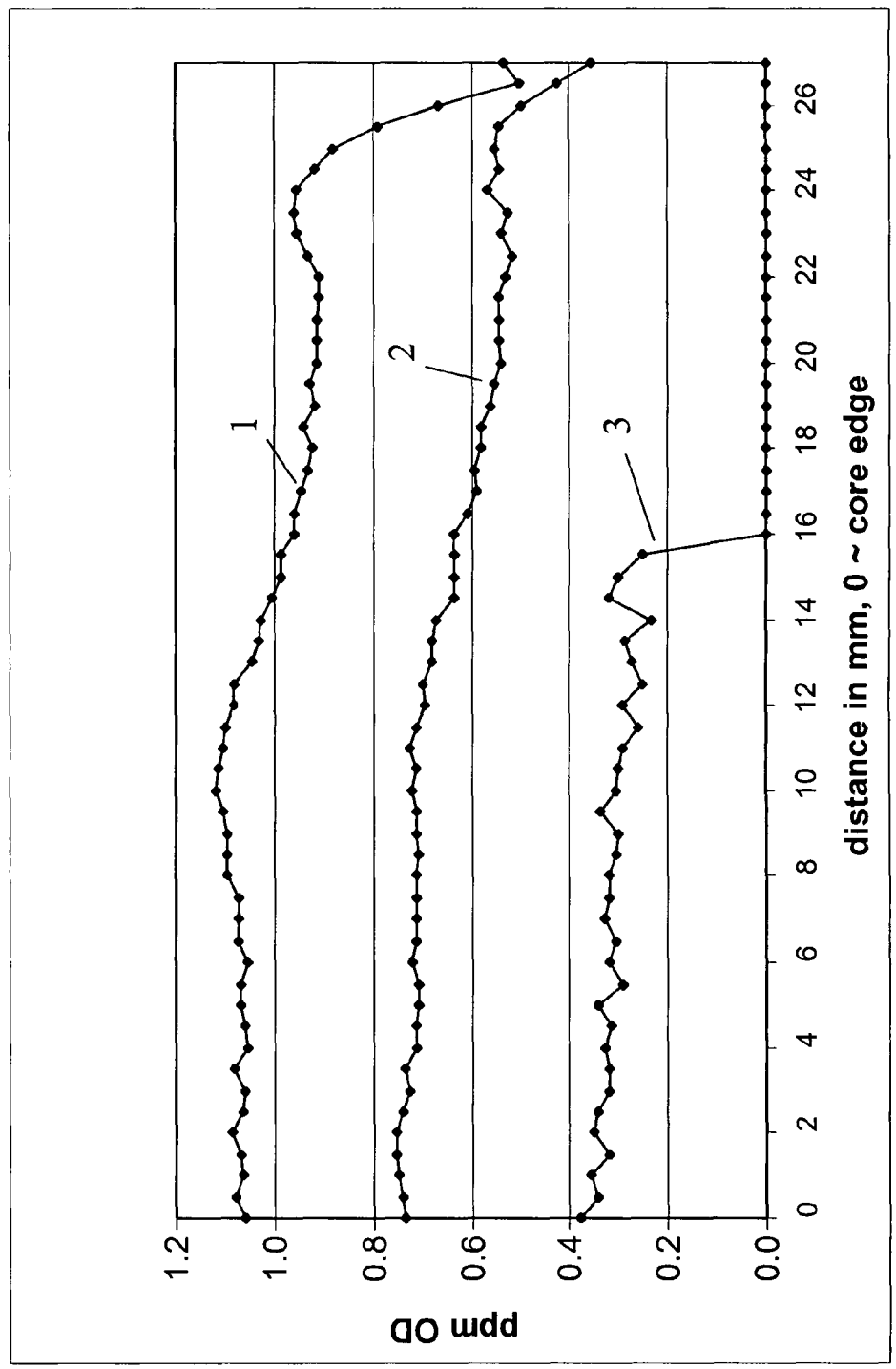
FIG. 5 is a plot of OD concentration as a function of position for the sintered soot blank described in FIG. 4.

A cylindrical soot blank was dried in a helium atmosphere containing 1% CO at 1225° C. for 16 hours. Deuterium ($D_2$) was added for one hour to the drying atmosphere at about midway through the drying step. The deuterium concentration in the helium atmosphere was 0.3%. The soot blank was then oxidized in a helium atmosphere containing 2% oxygen for one hour, and sintered at 1225° C. in a helium atmosphere containing 2% oxygen for 3-6 hours. The tapered ends of the soot blank were removed and the OH and OD concentrations were measured for cross sections of the remaining uniform, cylindrical soot blank, as described in Example 1. The OH concentration of the resulting cylindrical fused silica piece is plotted in FIG. 4 as a function of distance from the center or core of the cylindrical piece for a top section ((1) in FIG. 4), mid-point (2), and bottom section (3). The OH concentration was determined to be about 0.5 ppm in the region extending out to about 22 cm from the center of the core, whereas the OH concentration near ($\geq$~24 cm from the core) the outer surface of the fused silica piece ranged from about 1.8 ppm to about 2.4 ppm due to doping of the outer surface by trace amounts of water that were present during sintering. The OD concentration of the fused silica piece is plotted in FIG. 5 as a function of distance from the center or core of the cylindrical piece for a top section ((1) in FIG. 4), middle section (2), and bottom section (3). At OD concentrations of about 2 ppm, spectral noise overwhelms OD absorption at about 2700 $cm^{-1}$ for the fused silica sample described in this example, thus causing the OD concentration to drop off to zero.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A fused silica article, the fused silica article having a mean combined concentration of OH and OD of less than about 10 ppm and being substantially halogen-free, wherein the fused silica article is an optical component in a photolithography system, and wherein the fused silica article is formed by:
    a. providing a soot blank;
    b. drying the soot blank in a halogen-free atmosphere comprising carbon monoxide;
    c. oxidizing the dried soot blank; and
    d. sintering the blank to form the fused silica article.

2. The fused silica article according to claim 1, wherein the fused silica article is doped with at least one of deuterium and protium.

3. The fused silica article according to claim 2, wherein doping the dried blank comprises exposing the soot blank to a halogen-free gas mixture, the halogen-free gas mixture comprising an inert gas, carbon monoxide, and at least one of a protium-containing compound and a deuterium-containing compound.

4. The fused silica article according to claim 3, wherein the halogen-free gas mixture has a concentration of at least one of deuterium and protium in a range from about 0.1% to about 0.001%.

5. The fused silica article according to claim 2, wherein the combined concentration of OH and OD at any point in the article_varies by less than 4 ppm from the mean combined concentration of OH and OD.

6. The fused silica article according to claim 5, wherein the combined concentration of OH and OD at any point in the article_varies by less than 0.4 ppm from the mean combined concentration of OH and OD.

7. The fused silica article according to claim 2, wherein the steps of drying the soot blank and doping the soot blank are performed simultaneously.

8. The fused silica article according to claim 1, wherein drying the soot blank comprises heating the soot blank at a temperature in a range from about 1150° C. up to about 1300° C.

9. The fused silica article according to claim 8, wherein drying the soot blank comprises heating the soot blank at a temperature in a range from about 1200° C. up to about 1260° C.

10. The fused silica article according to claim 1, wherein the halogen-free atmosphere comprises from about 0.01% up to about 100% carbon monoxide.

11. The fused silica article according to claim 1, wherein the halogen-free atmosphere comprises an inert gas and from about 0.5% up to about 10% carbon monoxide.

12. The fused silica article according to claim 1, wherein the mean combined concentration of OH and OD is less than about 1 ppm.

13. The fused silica article according to claim 1, wherein the step of oxidizing the dried soot blank comprises heating the dried soot blank at a predetermined temperature in an oxidizing atmosphere comprising an inert gas and oxygen.

14. The fused silica article according to claim 13, wherein the oxidizing atmosphere comprises from about 0.5% up to about 5% oxygen.

15. The fused silica article according to claim 1, further comprising the step of preheating the fused silica soot blank at a predetermined temperature for a predetermined time before the step of drying the soot blank.

16. The fused silica article according to claim 1, wherein the fused silica article is a lens.

17. The fused silica article according to claim 1, wherein the soot blank is substantially free of germanium.

18. A fused silica article, the fused silica article having a mean combined OH and OD concentration of less than about 10 ppm and being substantially halogen-free, wherein the fused silica article is an optical component in a photolithography system, and wherein the fused silica article is formed by:
   a. providing a soot blank;
   b. drying the soot blank, wherein drying the soot blank comprises heating the soot blank at a temperature in a range from about 1150° C. up to about 1300° C. in a halogen-free atmosphere comprising carbon monoxide and at least one of a deuterium-containing species and a protium-containing species;
   c. oxidizing the dried soot blank at a predetermined temperature in an oxidizing atmosphere comprising an inert gas and oxygen; and
   d. sintering the oxidized soot blank to form the fused silica article, wherein the mean combined OH and OD concentration in the fused silica article is less than about 10 ppm.

19. A method of making a fused silica article, the method comprising the steps of:
   a. providing a soot blank;
   b. drying the soot blank in a halogen-free atmosphere comprising carbon monoxide;
   c. oxidizing the dried soot blank; and
   d. sintering the blank to form the fused silica article, wherein the fused silica article has a mean combined concentration of OH and OD of less than about 10 ppm and is substantially halogen-free, and wherein the fused silica article is an optical component in a photolithography system.

20. The method according to claim 19, wherein the step of drying the soot blank comprises heating the soot blank at a temperature in a range from about 1150° C. up to about 1300° C.

21. The method according to claim 20, wherein the step of drying the soot blank comprises heating the soot blank at a temperature in a range from about 1200° C. up to about 1260° C.

22. The method according to claim 19, wherein the halogen-free atmosphere comprises from about 0.1% up to about 100% carbon monoxide.

23. The method according to claim 19, wherein the halogen-free atmosphere comprises an inert gas and from about 0.5% up to about 10% carbon monoxide.

24. The method according to claim 19, wherein the step for drying the soot blank in a halogen-free atmosphere comprising carbon monoxide comprises heating the soot blank at a temperature in a range from about 1150° C. up to about 1300° C. in a halogen-free atmosphere comprising an inert gas, carbon monoxide, and at least one of a deuterium-containing species and a protium-containing species.

25. The method according to claim 19, wherein the combined concentration of OH and OD varies by less than 4 ppm from the mean combined concentration of OH and OD.

26. The method according to claim 19, wherein the mean combined concentration of OH and OD in the fused silica article is less than about 1 ppm.

27. The fused silica article according to claim 26, wherein the combined concentration of OH and OD in the fused silica article varies by less than 0.4 ppm from the mean combined concentration of OH and OD.

28. The method according to claim 19, wherein the step of oxidizing the dried soot blank comprises oxidizing the dried soot blank at a predetermined temperature in an oxidizing atmosphere comprising an inert gas and oxygen.

29. The method according to claim 19, wherein the oxidizing atmosphere comprises from about 0.5% up to about 5% oxygen.

30. The fused silica article according to claim 19, further comprising the step of preheating the fused silica soot blank at a predetermined temperature for a predetermined time before the step of drying the soot blank.

31. The method according to claim 19, wherein the soot blank is substantially free of germanium.

32. The method according to claim 19, wherein the fused silica article is a lens.

33. A fused silica article, wherein the fused silica article has a mean combined concentration of OH and OD of less than about 10 ppm and is substantially halogen-free, and wherein the fused silica article is an optical component in a photolithography system.

34. The fused silica article according to claim 33, wherein the fused silica article is doped with at least one of deuterium and protium.

35. The fused silica article according to claim 34, wherein the combined concentration of OH and OD at any point in the article_varies by less than 4 ppm from the mean combined concentration of OH and OD.

36. The fused silica article according to claim 35, wherein the combined concentration of OH and OD at any point in the article_varies by less than 0.4 ppm from the mean combined concentration of OH and OD.

37. The fused silica article according to claim 33, wherein the mean combined concentration of OH and OD is less than about 1 ppm.

38. The fused silica article according to claim 33, wherein the fused silica article is a lens.

39. The fused silica article according to claim 33, wherein the soot blank is substantially free of germanium.

* * * * *